US000001392H

United States Statutory Invention Registration [19]

[11] Reg. Number: H1392

Frederick

[43] Published: Jan. 3, 1995

[54] SPECIALTY BOOM AND OUTRIGGER SYSTEM FOR USE WITH OFFSHORE SKIMMERS

[75] Inventor: Paul E. Frederick, Covington, La.

[73] Assignee: Exxon Production Research Company

[21] Appl. No.: 241,384

[22] Filed: Apr. 7, 1994

[51] Int. Cl.[6] ..... E02B 15/04; B01D 17/02

[52] U.S. Cl. ..... 405/63; 210/242.3

[58] Field of Search ..... 114/270; 405/63; 210/242.3

*Primary Examiner*—David Brown

*Attorney, Agent, or Firm*—James H. Riley II

[57] ABSTRACT

A specialty boom and outrigger apparatus and method for use with an offshore skimmer device and a floating vessel for corralling buoyant substances. The apparatus has an elongated flexible boom with floating members and is connected to an elongated towing member with guide members. The towing member is connected to a mast with guide members and the mast is connected with a vessel with guide members.

1 Claim, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SPECIALTY BOOM AND OUTRIGGER SYSTEM FOR USE WITH OFFSHORE SKIMMERS

BACKGROUND OF THE INVENTION

1. Field of the Invention

This invention relates to an apparatus and method useful for offshore oil spill clean-up and, more particularly, to a specialty boom and outrigger system for gathering spilled oil to be recovered by an offshore skimmer.

2. Description of the Related Art

It is an opening concern for parties involved in offshore petroleum exploration, production and transportation to minimize danger to human and marine life and damage to the ocean and beach environment. Proper planning and execution of oil spill control is essential to the accomplishment of that goal. Effective containment and recovery of spilled oil allows damage to be minimized and limits expenses and opportunity costs of redirecting limited resources, such as equipment and manpower from their primary purpose.

Various types of equipment have been used to contain or gather spilled oil, including suction nozzles, weir skimmers, sorbents and other special devices designed for this purpose. The use of suction nozzles is effective at recovering thick layers of oil, but is limited by waves. When used on thin or patched oil slicks, suction nozzles collect a disproportionately large amount of water, requiring huge storage and separation facilities. Sorbents and gelling agents are difficult to distribute and recover when used over a large area. Large spills require significant amounts of sorbents, the handling and disposal of which is extremely costly.

A skimmer device includes an engine and suction pump that is propelled over the water and sucks or paddles oil into a tank. The skimmer can be mounted on a skiff or small boat. The boat is maneuvered to where the oil has been corralled with the use of an oil spill boom so that the skimmer takes the oil off the top of the water like a vacuum cleaner and pumps it into a tank. Weir skimmers allow the surface layer of oil to flow by gravity into a container. They are effective on thick layers of oil when waves and the current are small. If the oil layer is thin or the waves are large, weir skimmers, however, collect water in large quantities.

Presently, offshore skimming units require a means of carrying the skimmer, means of corralling the oil to the skimmer and means of storing the skimmed fluids. Typically, one work boat carries the skimmer and one or two vessels corral the spilled oil by dragging a long length of approximately 300′ of regular oil containment boom between them or attached to the skimmer vessel. The use of conventional oil containment booms for corralling spilled oil presents several problems. First, maneuvering is difficult when a second boat is required to control the boom. At speeds of more than one knot, skimmed fluids pass under the boom, making corralling ineffective. Because conventional booms typically have very little freeboard, waves typically splash over the top of the boom carrying the oil with them. In addition, it is frequently necessary to utilize a large vessel, such as a 120 ft. workboat, to withstand rough seas. The need for workboats is costly both in terms of expense and opportunity cost. Finally, large expensive outrigger-tank combinations are available for use in conjunction with this method of corralling but are cost prohibitive and require additional equipment in order for them to be erected on the skimmer vessel. Thus, there is a need for an oil spill recovery apparatus that is cost effective, minimizes the use of valuable resources and functions efficiently at corralling spilled oil.

SUMMARY OF THE INVENTION

The present invention is directed to a novel specialty boom and outrigger system to be used for corralling spilled oil for recovery with an oil skimmer. The boom incorporates floating members, preferably ethafoam logs, to provide buoyancy and has added freeboard to reduce splash-over. The surface of the boom is perforated and has heavy ballast which, combined with its buoyancy, enhances the boom's stability when towed.

The outrigger system of the present invention is constructed of material that is lightweight and strong and is easy to assemble. The system is designed to permit a single boat to pull the boom on either side of the boat. The outrigger consists of a vertical mast and a horizontal outrigger attached with guy wires. The boom is attached to the both ends of the outrigger and trails the boat. Of course, it may be advantageous to have a mast and outrigger on both sides of the boat to increase the area that a single boat can skim.

The present invention is cost effective to fabricate and eliminates the need for the use of a second vessel. The present invention further provides improved efficiency in recovery operations and is easier to assemble, maintain and use than currently available systems.

BRIEF DESCRIPTION OF THE DRAWINGS

A better understanding of the invention can be obtained with the detailed description of the present invention set forth below in conjunction with the accompanying drawings, in which.

DETAILED DESCRIPTION OF PREFERRED EMBODIMENT

Figure 1:
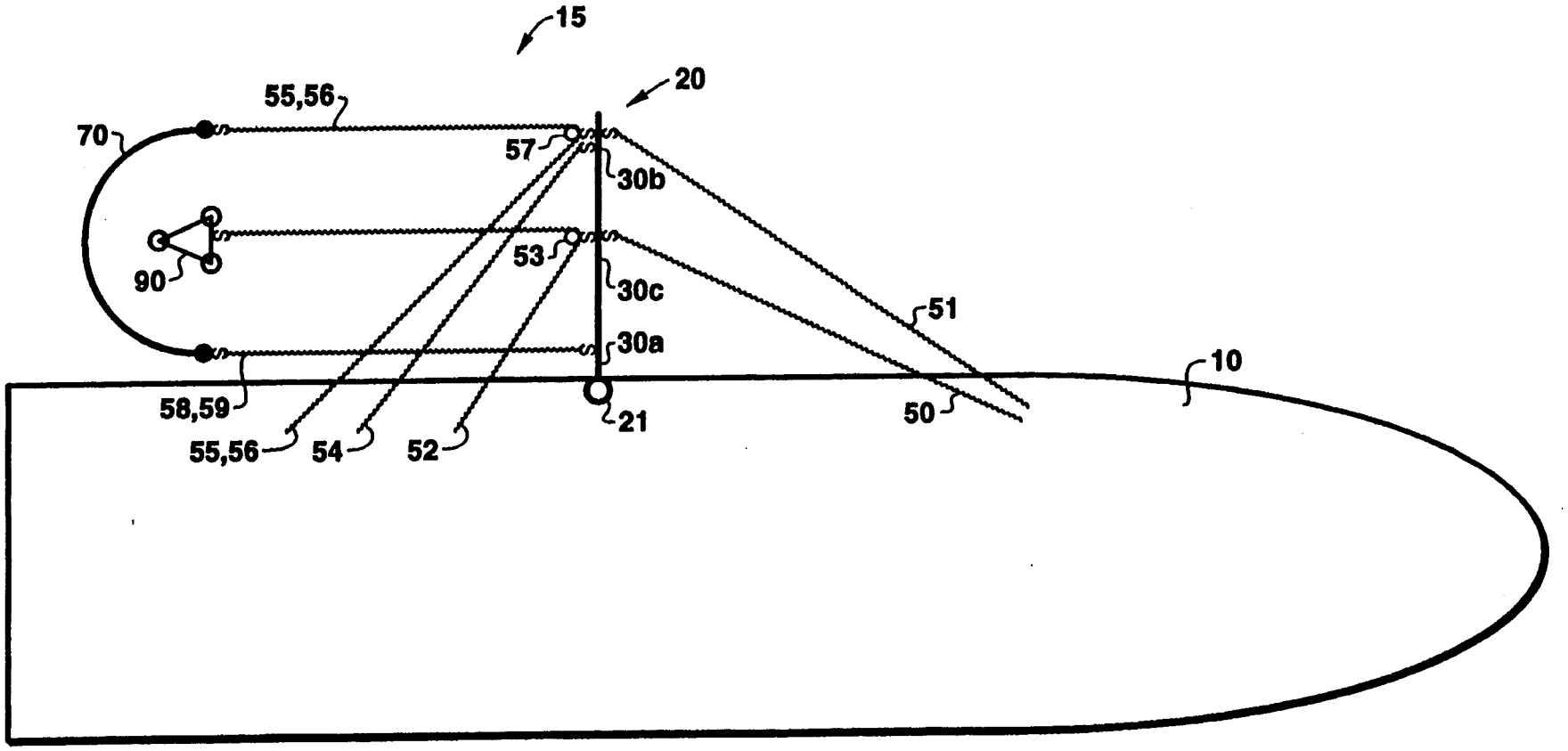
FIG. 1 is a top plan view of a boat equipped with a specialty boom and outrigger system of the invention.

The offshore specialty boom and outrigger system of the present invention, identified generally by numeral 15, is shown in FIG. 1 mounted on the side of a vessel 10, such as a 120 foot workboat or its equivalent. The two major assemblies of the present invention are an outrigger system 20, which is lightweight but structurally capable of supporting the entire apparatus and a skimmer boom assembly 70, which preferably has enhanced buoyancy and durability, as will be further described below.

Figures 2, 4:
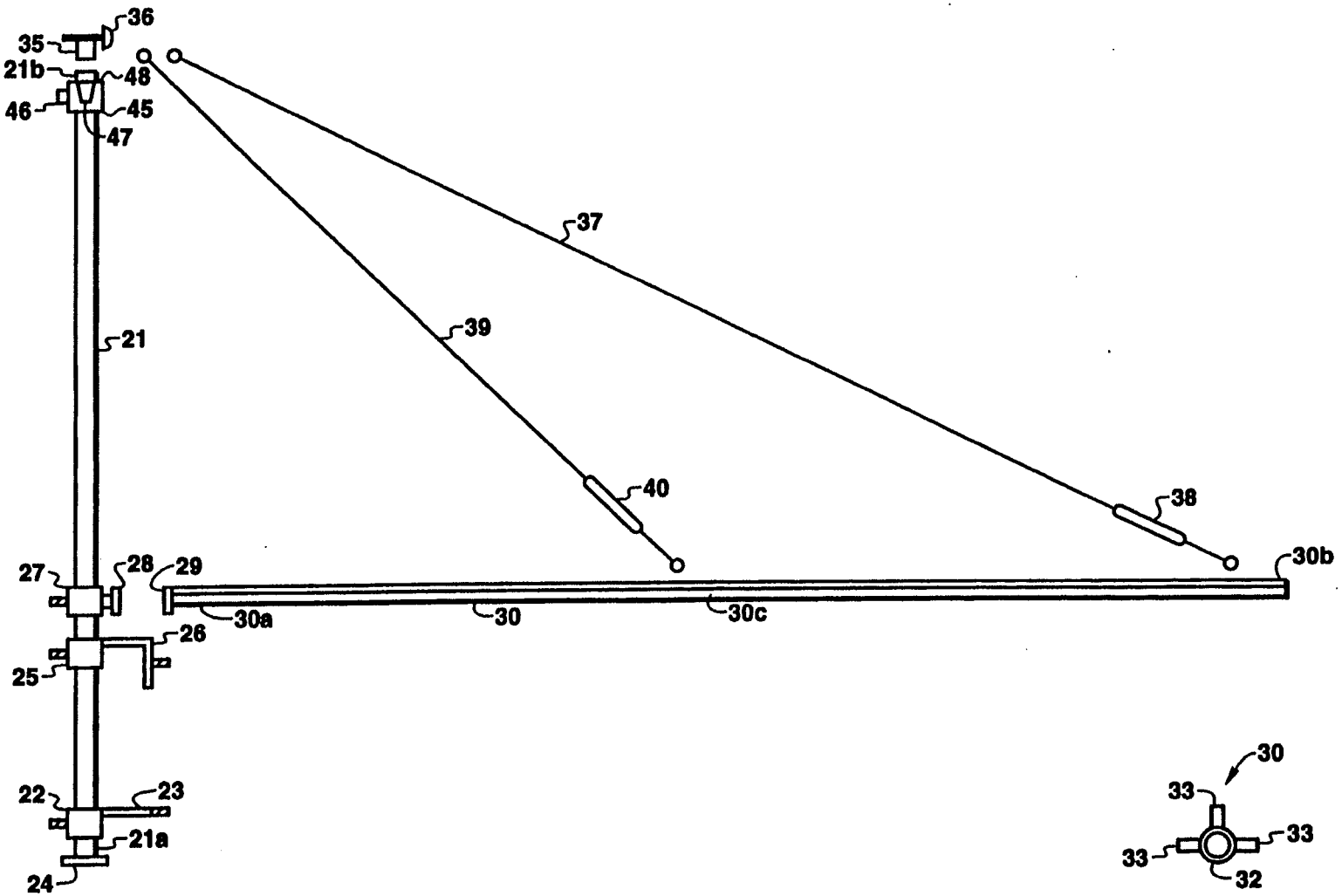
FIG. 2 is a side view of the mast and outrigger assemblies of the invention.
FIG. 4 is an enlarged end view of the outrigger.
Figure 3:
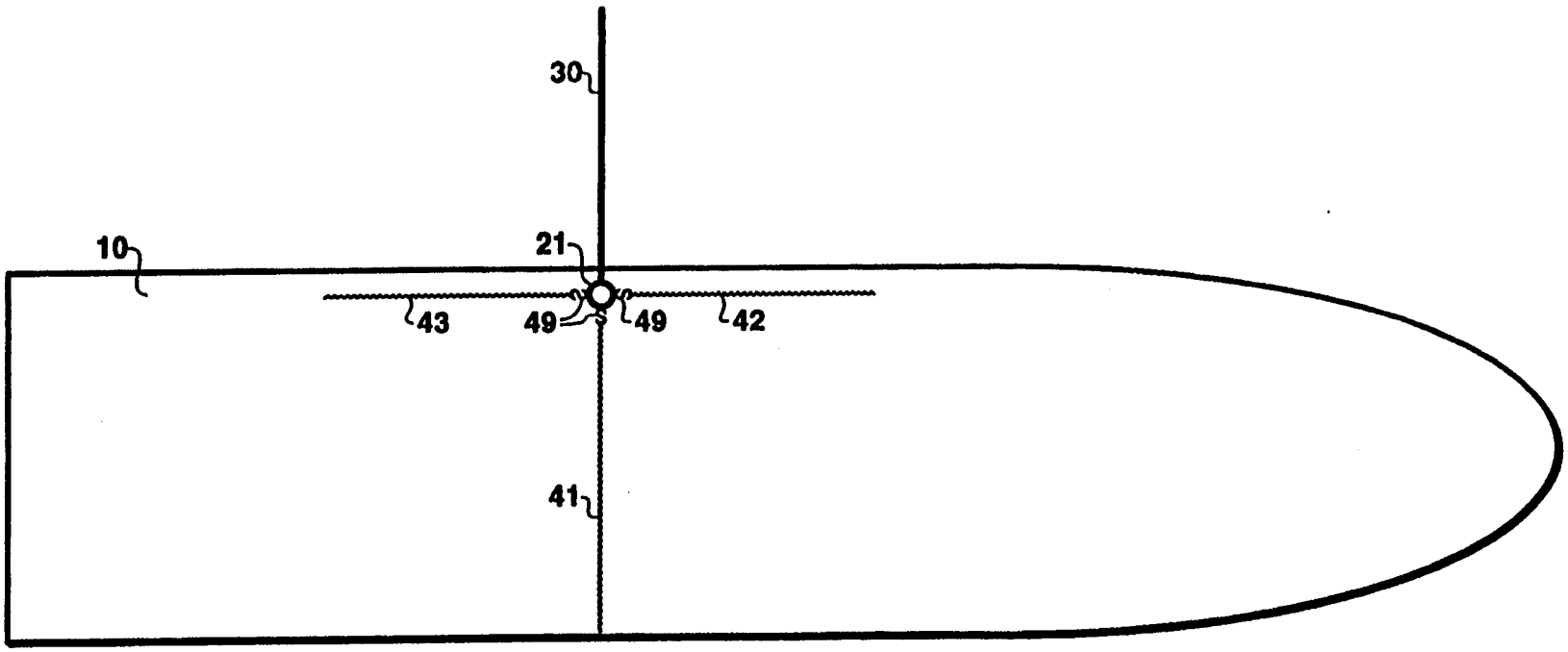
FIG. 3 is a top plan view of a boat equipped with an outrigger system made in accordance with the invention.

As shown in FIGS. 1–3, the outrigger system 20 includes a mast 21 extending vertically from a point on the vessel 10 adjacent to its side. In the preferred embodiment, the mast 21 is a ten foot section of three inch aluminum pipe. The mast 21, FIG. 2, is connected in the proximity of its lower end 21*a* to the floor of the vessel with a suitable connector device, preferably a 3½ inch I.D. steel slip-over 22, a steel gusset clamp 23 and a corresponding locking bolt (not shown). An aluminum flange 24 may be welded to the extremity of the lower end 21*a* of the mast 21 for enhanced balance and support. FIG. 2 shows a second connector device engageable between the mast 21 and the side rail of the vessel, preferably a second 3½ inch I.D. steel slip-over 25, a steel railing clamp 26 and a locking bolt (not shown).

A third 3½ inch steel slip-over 27 with a two inch flange 28 and locking bolt (not shown) is positioned on the mast 21 above the slip-over 25 and used to connect the mast 21 with an outrigger member 30 at a flange 29 welded onto the inboard end 30*a* of the outrigger 30 (FIG. 2). As shown in FIGS. 1–3, the outrigger 30 extends generally horizontally from the mast 21, across the side of the vessel 10 and over the surface of the water. The outrigger 30 is preferably a twenty foot section of two inch aluminum pipe 32 with a ½" flat aluminum bar 33 welded on each of three sides (FIG. 4), each bar 33 extending substantially across the length of the pipe 32.

The outrigger 30 is supported by the mast 21 with a plurality of ¼ inch guy wires. As shown in FIG. 2, an aluminum top bracket 35 is inserted into the upper end 21*b* of the mast 21 and has a shackle 36 extending laterally therefrom. A guy wire 37 is connected between the shackle 36 and a turnbuckle 38, which is connected to the outboard end 30*b* of the outrigger 30. Guy wire 39 similarly extends between the shackle 36 and turnbuckle 40, which connects to the outrigger 30 in the proximity of its midpoint 30*c*.

The mast 21 is supported in vertical position on the vessel 10 with a plurality of guy ropes, as shown in FIG. 3. In the preferred embodiment, thirty foot guy ropes 41, 42 and 43 extend from a 3½ inch I.D. slip-over 45 (FIG. 2) with guy rope rings 46, 47 and 48 mounted near the upper end 21*b* of the mast 21 to suitable anchor members (not shown) mounted on the vessel 10. The guy ropes 41, 42 and 43 each have a hook 49 at one end (FIG. 3) for attachment with the rings 46, 47 and 48. As shown in FIG. 3, guy rope 43 extends from the mast 21 in the direction of the stern of the vessel 10, while the rope 42 extends opposite the rope 43 toward the bow of the vessel 10 to provide optimal support and balancoe of the mast 21. The guy rope 41 extends athwartships, or across the width of the vessel 10 to support the weight of the outrigger 30.

Figure 5:
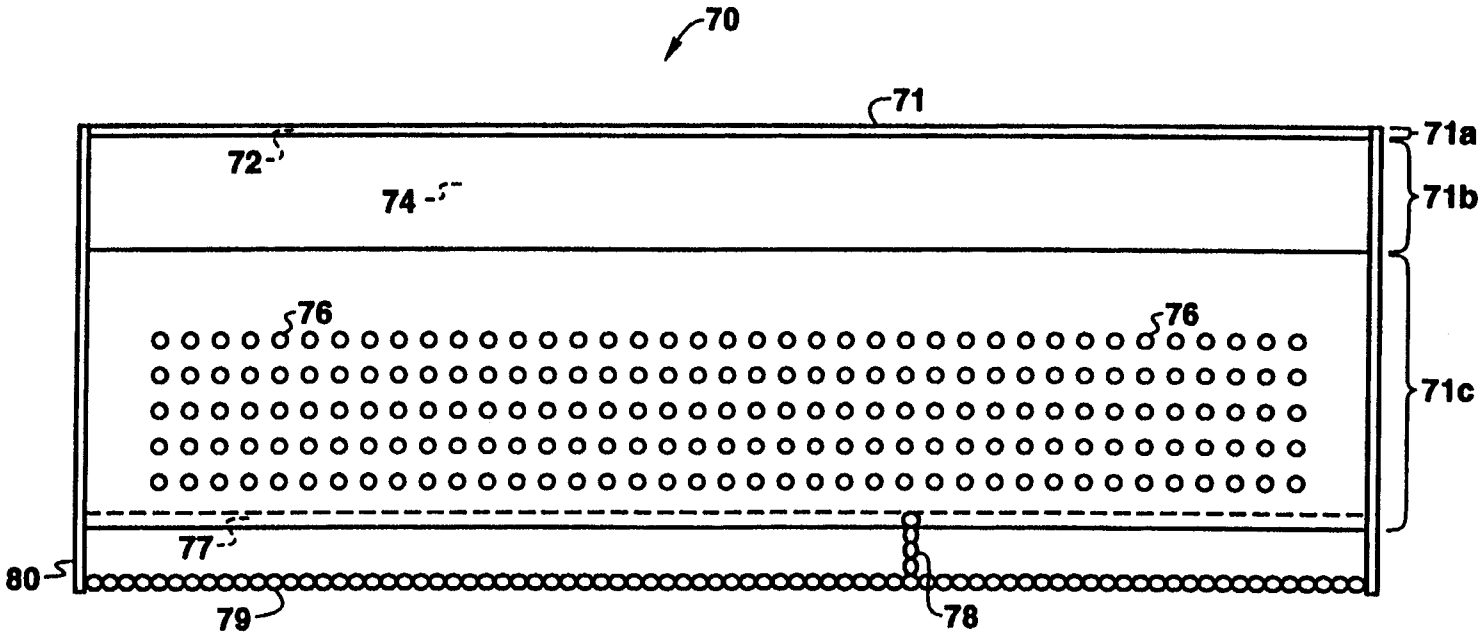
FIG. 5 is a partial front end view of the specialty boom made in accordance with the invention.

As shown in FIG. 5, the boom assembly 70 includes an elongated boom 71 constructed of pliable material, such as thirty-two ounce fabric, to provide enhanced durability. FIG. 1 shows the boom 71 towed in a half-circle configuration behind the outrigger 30 in order to corral the spilled oil within the vicinity of a skimmer device 90. The boom 71 has an approximate length of fifty-four feet and a height of fifty inches.

Figure 6:
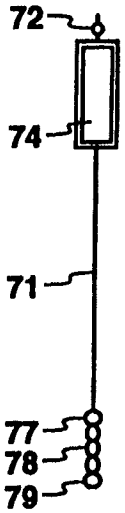
FIG. 6 is an end view of the specialty boom.

Referring to FIGS. 5 and 6, the entire length of the upper section 71*a* of the boom 71 contains a band of 5/16 inch coated cable in PVC tubing 72. A plurality of floating members 74, preferably ethafoam logs, are aligned end to end lengthwise and contained by the boom 71 below the tubing 72. In the preferred embodiment, each ethafoam log 74 is six inches in thickness, eighteen inches in height and six feet in length. Thus, the boom section 71*b* floats near the surface of the water to provide buoyancy and extra freeboard, which is helpful in reducing splash-over and enhancing corralling efficiency.

The boom section 71*c* is designed to be below the surface of the water and is formed with a plurality of holes 76 to reduce drag when the boom 71 is towed through the water. The boom assembly 70 has an anchor system to ensure that the boom section 71*c* extends below the surface of the water. A ½ inch galvanized chain 77 is formed into the lower edge of the boom section 71*c* and extends across the entire length of the boom 71. A plurality of spaced quick link connectors 78 connect the chain 77 with a ⅜ inch galvanized chain 79 that hangs below the entire length of the boom 71. In the preferred embodiment, the connectors 78 are positioned approximately every four feet along the length of the boom 71, but can be positioned closer or farther from one another to hold the chain 79 in generally spaced parallel relationship with the boom 71. A universal end connector 80 connects each end of the chain 78 to the corresponding side edge of the boom 71 and extends aoross the entire height of each side edge of the boom 71.

The outrigger 30 and the boom assembly 70 are connected to the vessel 10 with a plurality of ropes (FIG. 1). Ropes 50 and 51 are each connected at one end to the vessel 10 forward of the mast 21 with suitable connection means (not shown), and to the outrigger 30 with a hook (not shown) at the opposite end. The rope 51 is connected to the outrigger 30 near its outboard end 30*b*, while the rope 50 is connected to the outrigger 30 in the proximity of its midpoint 30*c*.

Ropes 52, 54, 55 and 56 each have a connector hook (not shown) on their outboard ends. The rope 52 is connected between the vessel 10 abaft the mast 21 and a skimmer device 90, passing through a pulley 53 mounted on the outrigger 30 near its midpoint 30*c* therebetween. The rope 54 is connected between the vessel 10 abaft the rope 52 and the outboard end 30*b* of the outrigger 30. The ropes 55, 56 extend from approximately the same point on the vessel 10 abaft the rope 54, through a double pulley 57 and connect with the upper and lower vertical corners of the boom's outboard end. Finally, a pair of ropes 58, 59 with hooks at each end (not shown) extend between the outrigger 30 in the proximity of its inboard end 30*a* and the upper and lower corners of the inboard end of the boom 70.

The specialty boom and outrigger system 15 of the present invention can be erected and installed on either side of the vessel 10 by two men using basic tools. If desired, the system 15 can be installed on both sides of the vessel 10 to maximize its efficiency. A second vessel is not needed with the present invention. Thus, the skimmer boom and outrigger system and method of the present invention is useful in recovering spilled oil.

The foregoing disclosure and description of the invention is illustrative and explanatory thereof, and various changes in the size, shape, and materials, as well as in the details of illustrative construction and assembly, may be made without departing from the spirit of the invention.

What is claimed is:

1. An apparatus for use with a floating vessel for containing buoyant substances, comprising:

corralling means, comprising an elongated flexible member connected with a plurality of floating members; and, outrigger means for towing said corralling means off the side of the vessel, comprising;

an elongated horizontal towing member;

a first plurality of guide members connected between said towing member and said flexible member; and a vertical member fixed to the vessel and connected to said towing member by means of a second plurality of guide members.

* * * * *